Dec. 19, 1944.   L. D. HILLYER   2,365,408
SAW EQUIPMENT FOR TRACTORS
Filed March 5, 1943   5 Sheets-Sheet 1
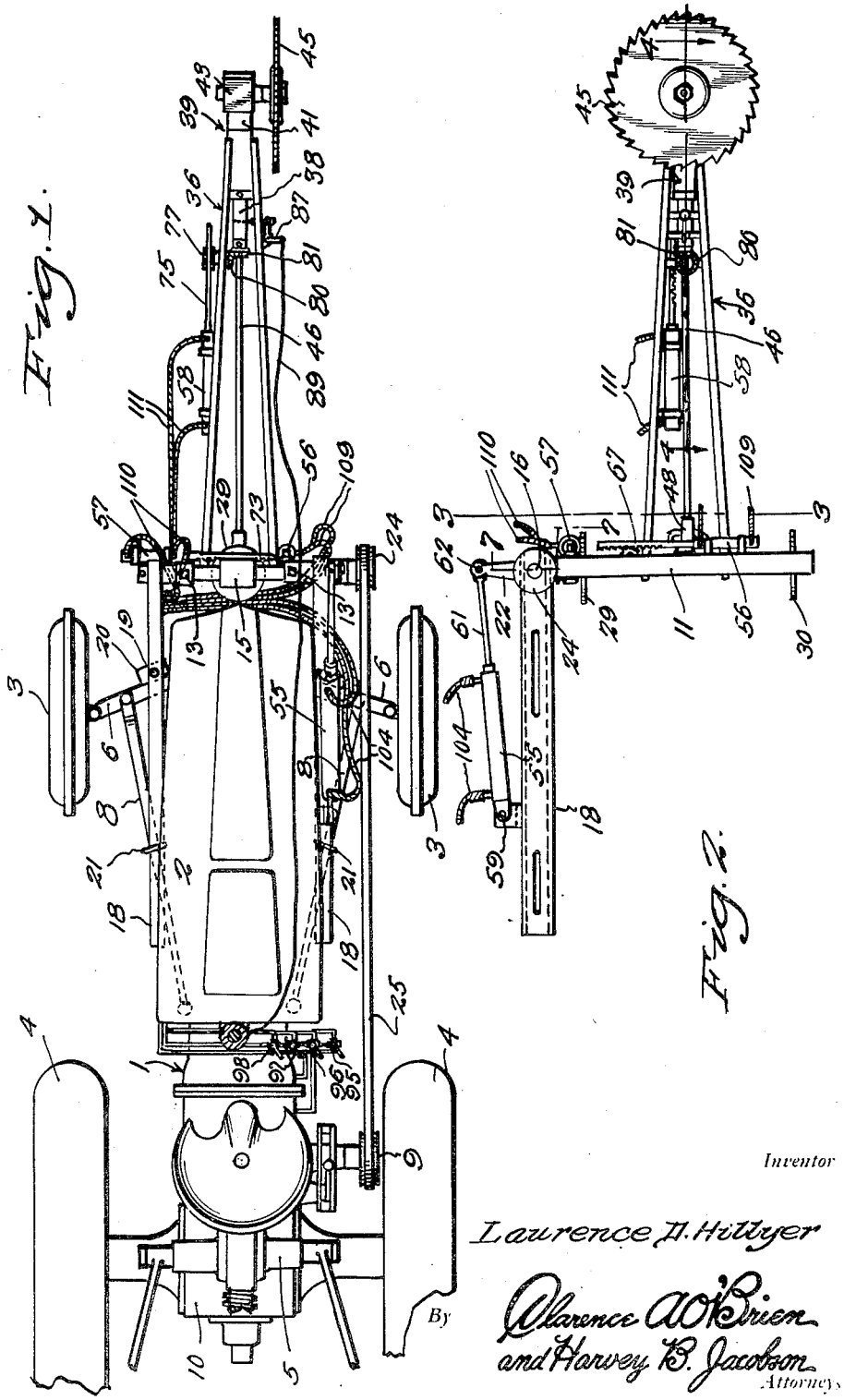
Inventor
Laurence D. Hillyer
By Clarence A. O'Brien
and Harvey B. Jacobson
Attorneys Dec. 19, 1944.     L. D. HILLYER     2,365,408
SAW EQUIPMENT FOR TRACTORS
Filed March 5, 1943     5 Sheets-Sheet 2
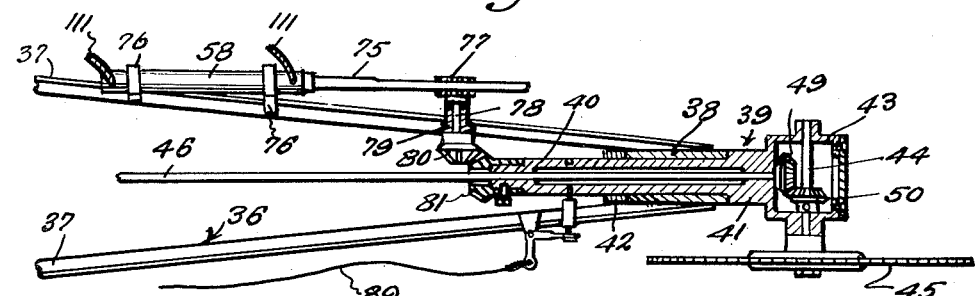
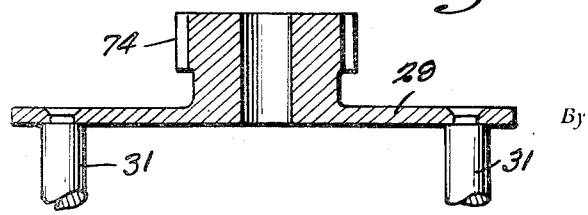
Inventor
Laurence D. Hillyer
By Clarence A. O'Brien
and Harvey B. Jacobson
Attorneys

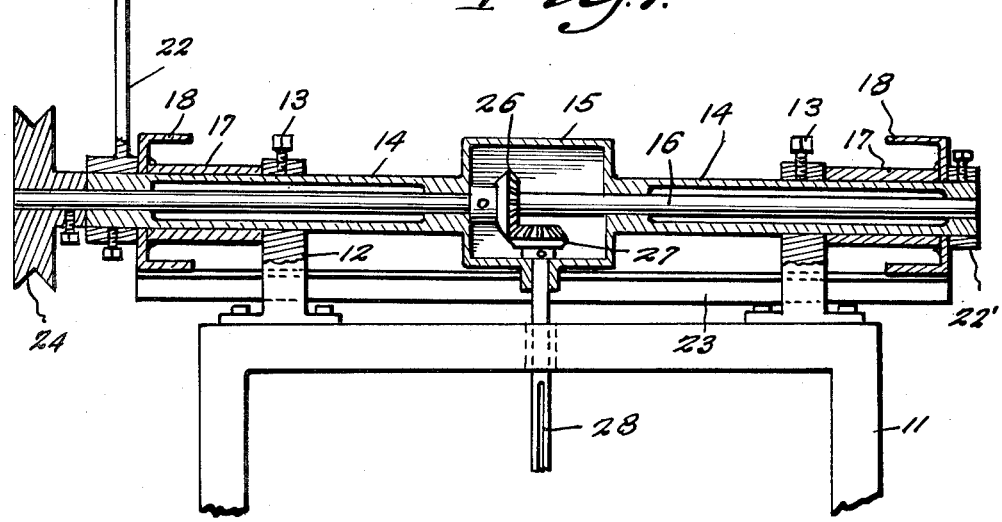
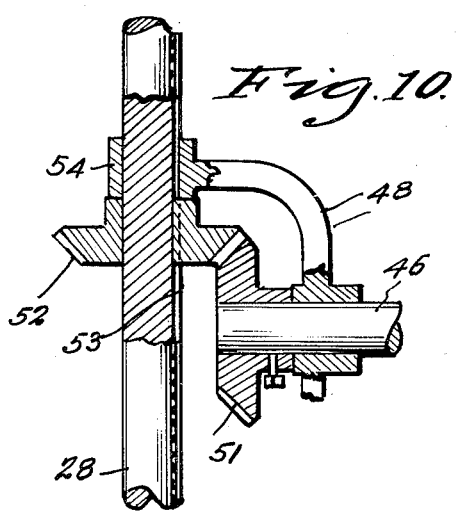
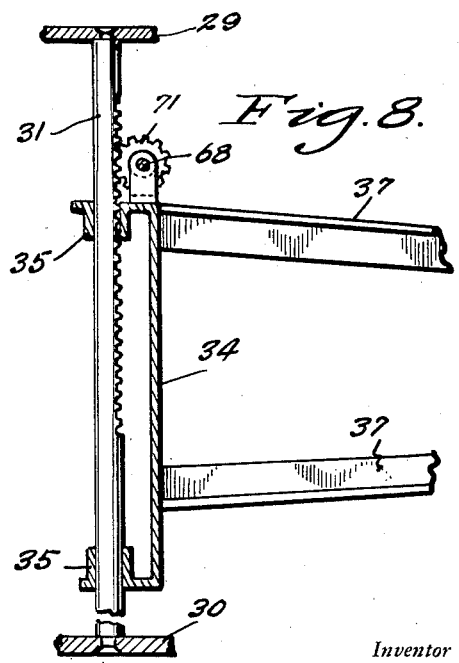
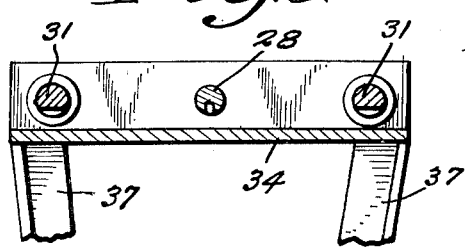

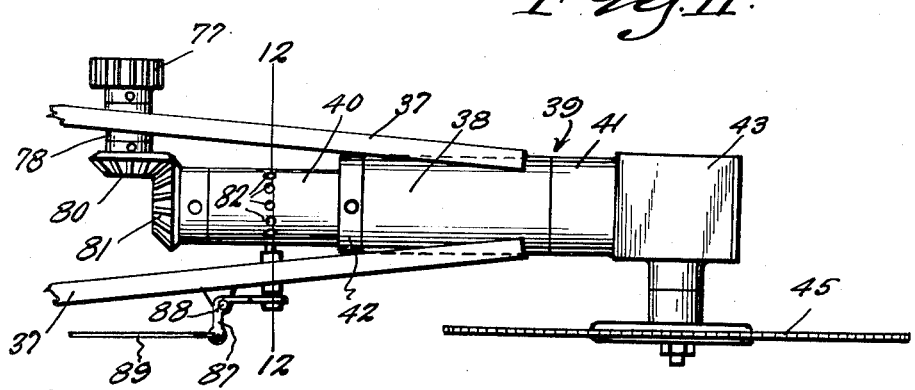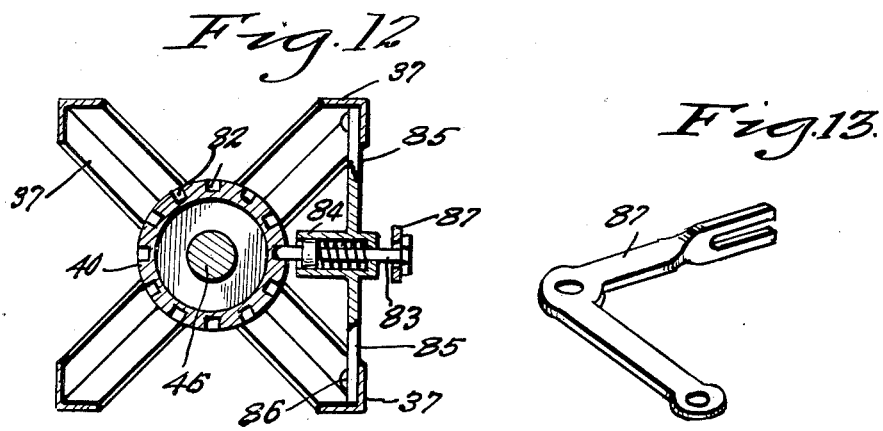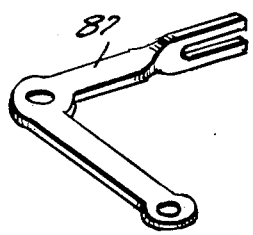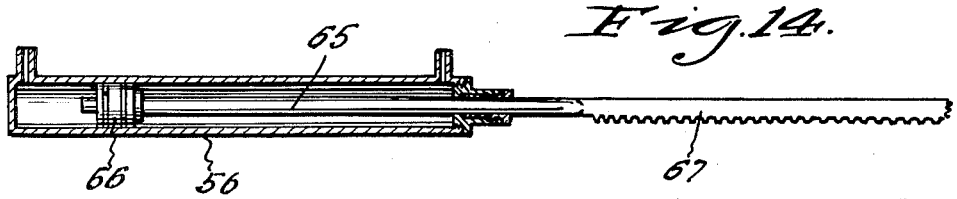

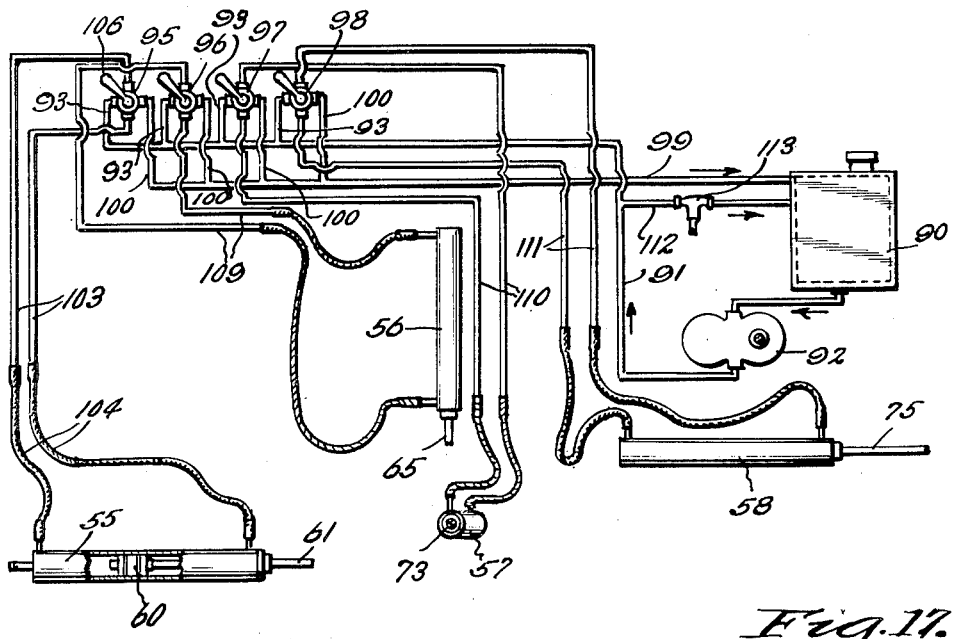

Patented Dec. 19, 1944

2,365,408

UNITED STATES PATENT OFFICE 2,365,408

SAW EQUIPMENT FOR TRACTORS

Laurence D. Hillyer, Alice, Tex.

Application March 5, 1943, Serial No. 478,137

4 Claims. (Cl. 143—43)

My invention relates to improvements in sawing equipment for use on tractors and the like.

The invention is designed with the primary object in view of providing a tractor-propelled saw equipment for cutting brush and the like, particularly mesquite and cedar, and which embodies a rotary, tractor-driven saw, and means to variably swing the saw and adjust the same for cutting at different angles, so that the brush may be cut in swaths, or not, as desired, close to the ground, or otherwise, and small trees, or limbs thereof, cut high up from the ground.

Another object is to provide apparatus of the character and for the purpose above set forth which is adapted for incorporation with various types of tractors for one-man operation, and in which weight is reduced to a minimum without sacrificing operating efficiency, and maximum flexibility as regards adjustment and operating capability attained.

Still another object is to provide apparatus for the purposes above set forth, which is hydraulically controlled, simple in construction, involves comparatively few parts, and may be manufactured at a relatively low cost.

Other and subordinate objects are also comprehended by my invention, all of which, together with the precise nature of my improvements, will be readily understood when the succeeding description and claims are read with reference to the drawings accompanying and forming part of this specification.

In said drawings:

Figure 1 is a view in top plan of my improved saw equipment, in its preferred embodiment, incorporated with a tractor, Figure 2 is a view in side elevation of the saw equipment or apparatus detached, Figure 3 is a view in vertical transverse section taken on the line 3—3 of Figure 2 and drawn to an enlarged scale, Figure 4 is a fragmentary view in horizontal section taken on the line 4—4 of Figure 2 and drawn to an enlarged scale, Figure 5 is a view in vertical section taken on the line 5—5 of Figure 3, Figure 6 is a view in vertical section of the upper end of the rack frame, Figure 7 is a view in vertical section taken on the line 7—7 of Figure 2 and drawn to an enlarged scale, Figure 8 is a view in vertical section taken on the line 8—8 of Figure 3 and drawn to an enlarged scale, Figure 9 is a view in horizontal section taken on the line 9—9 of Figure 3 and drawn to an enlarged scale, Figure 10 is a view in vertical section taken on the line 10—10 of Figure 3, and drawn to a further enlarged scale, Figure 11 is a fragmentary view in top plan of the crane, saw, saw head and parts associated therewith, Figure 12 is a view in transverse section taken on the line 12—12 of Figure 11 and drawn to an enlarged scale, Figure 13 is a view in perspective of the bell crank, Figure 14 is a view in longitudinal section of one of the control cylinders and parts associated therewith, Figure 15 is a schematic view of the hydraulic control means, Figure 16 is a view in end elevation of one of the control valves, and Figure 17 is a view in transverse section of said valve.

Referring to the drawings by numerals, my improved saw equipment has been illustrated therein, by way of exemplification, as incorporated with a tractor of the commercially designated "Ford Ferguson" type, 1 designating the chassis thereof, 2 the power plant, 3 the front wheels, 4 the rear wheels, and 5 the rear power lift. In this type of tractor the front wheels are mounted on axle bars 6 braced by radius rods 8, and a power take-off including a pulley 9 extends from one side of the transmission casing 10.

According to my invention, a rectangular, main frame 11 is mounted at the front of the tractor in suspended position for forward and rearward swinging movement. For this purpose, said main frame 11 is provided at the top thereof with a pair of laterally spaced hangers 12 fixed by means of set screws 13 on a pair of tubular bearing sleeves 14 extending oppositely from a gear casing 15 and forming together with said casing a drive housing for a saw driving shaft 16 extending through the housing.

The described drive housing, and the drive shaft 16 extend horizontally across the front of the tractor with the ends of the sleeves 14 journaled in suitable bearings 17 provided on a pair of channel iron beams 18 arranged alongside opposite sides of the chassis 1 of the tractor and secured thereto. Preferably, the beams 18 are secured to the chassis 1 by bolting the same, as at 19, to blocks 20 suitably fixed to the axle bars 6, and said beams are anchored to the radius rods 8 by U bolts, as at 21. As will be seen, the main frame 11 is thus suspended low down on the tractor. The outer ends of the bearing sleeves 14 extend outwardly of the beams 18. An upstanding crank arm 22 fast on the extending end of one sleeve 14, and a set collar 22' (Fig. 7) fast on the extending end of the other sleeve 14 prevent endwise play of the drive housing in the bearings 17. At the front ends thereof, the beams 18 are braced by a cross bar 23. The function of the crank arm 22 will presently be explained.

The drive shaft 16 is equipped at one end thereof with a pulley 24 to which the pulley 9 of the power take-off of the tractor is operatively connected by a belt 25. Within the gear casing 15, a beveled gear 26 fast on the drive shaft 16 meshes with a similar gear 27 fast on the upper end of an upright jack shaft 28 journaled in the upper and lower ends of the main frame 11 in the vertical center thereof, and also journaled in the gear casing 15. The shaft 16, pulley 24, and jack shaft 28 form parts of the saw drive, the remaining elements of which will presently be described.

Within the main frame 11 (Fig. 3) is a rack frame comprising a pair of upper and lower end discs 29, 30 rotatable concentrically about the jack shaft 28, and a pair of upstanding rack bars 31 with forwardly facing teeth 32 thereon and connecting the discs 29, 30 together upon diametrically opposite sides of the jack shaft 28, said bars 31 being equidistantly spaced from said jack shaft 28. A spacing collar 33 on the lower disc 30 provides an end thrust bearing for the rack frame engaging the lower end of the main frame 11. As will be seen, the described rack frame is arranged for oscillation about the jack shaft 28.

A plate-like crane, or boom, carriage 34 is slidably mounted, by means of corner sleeves 35 thereon, on the rack bars 31 in front thereof for vertical adjustment into different set positions.

A crane, or boom, 36 extends forwardly from said carriage 34 and comprises longitudinally extending, forwardly converging, angle iron bars 37 suitably fixed at their rear ends to said carriage 34, as by welding, not shown, and having fixed between the front ends thereof a longitudinally extending bearing sleeve 38.

Rotatably mounted in the bearing sleeve 38 (Figs. 4 and 11) is a saw carrying head 39 having the form of a hollow shaft 40 with a rear end extending rearwardly out of said bearing sleeve 38 and front and rear collars 41, 42 thereon engaging opposite ends of said bearing sleeve 38 to prevent endwise play of said shaft in said sleeve. The front end of the hollow shaft 40 is equipped with a gear casing 43 having suitably journaled therein a saw carrying shaft 44 extending transversely of said casing, and crane, or boom, with one end projecting out of one side of the gear casing 43. A suitable circular saw 45 is fixed on the projecting end of the saw carrying shaft 44.

Returning now to the drive, a drive transmitting shaft 46 extends longitudinally through the crane, or boom, 36 in the axis thereof with its front end extending through and suitably journaled in the hollow shaft 40 of the head 39, and the rear end thereof extending through an aperture 47 in the carriage 34 and journaled in a bearing yoke 48 fast on said carriage 34 (see Fig. 5). A pair of beveled gears 49, 50 fast on the front end of said shaft 46 and on the saw carrying shaft 44, respectively, within the gear casing 43 operatively connect said shaft 46 to the saw carrying shaft 44. A similar gear drive is provided between the jack shaft 28 and the rear end of the drive transmitting shaft 46, one bevel gear 51 being fast on said shaft 46, and the other gear 52 being splined on the jack shaft 28, as indicated at 53 (Fig. 10), and held in mesh with the gear 51 by a sleeve 54 on the yoke 48 slidable on said jack shaft 28.

In addiiton to the foregoing, my invention includes hydraulic means for swinging the main frame 11, oscillating the described rack frame, adjusting the crane, or boom, carriage 34 vertically on said rack frame, and adjusting the saw carrying head 39 rotatably, said means comprising a plurality of hydraulic cylinders 55, 56, 57, 58.

The hydraulic cylinder 55 forms part of means for swinging the main frame 11, and is pivoted at one end, as at 59 (Fig. 2), on one of the beams 18, for a purpose presently clear, and to extend forwardly toward the crank 22 previously mentioned as fast on one sleeve 14 of the drive shaft housing. The hydraulic cylinder 55 is equipped with a suitable piston 60 (Fig. 15), and a piston rod 61, the latter pivoted, as at 62, to the crank arm 22, so that under movement of the piston 60 in opposite directions from a central position in the cylinder 55, the crank arm 22 will be correspondingly swung, and the drive shaft housing rocked to swing the main frame 11 forwardly or rearwardly, as the case may be.

The hydraulic cylinder 56, shown in detail in Figure 14, forms part of means for adjusting the crane, or boom, carriage vertically and is suitably fixed, as at 63 (Fig. 3), in upstanding position, on the lower disc 30 of the rack frame to slidably extend through a guide 64 on one side of said carriage 34. A piston rod 65 extends from a piston 66 in said cylinder 56 out of the other end thereof, and, exteriorly of said cylinder 56, has the form of a rack bar 67. The rack bar 67 meshes with a gear pinion 68 fast on one end of a horizontal shaft 69 journaled in suitable bearings 70 fast on the top of the crane, or boom, carriage 34. A pair of toothed pinions 71 fast on said shaft 68 mesh with the teeth 32 of the rack bars 31. The relation of the piston 66, rack bar 67, gearing 68, 71 and the rack bars 31 is such that under vertical movement of the piston 66 in opposite directions from a central position in the cylinder 56, the crane, or boom, carriage 34 will be adjusted vertically in opposite directions from a central position relative to the described rack frame and the main frame 11.

Referring briefly now to the hydraulic cylinder 57, said cylinder is mounted in horizontal position on the main frame 11, at the upper end thereof, by brackets 72 and is a counterpart, as regards its piston, not shown, and its piston rod 73, of the piston 66 and piston rod 65, the rack bar of said piston 73 meshing with a gear pinion 74 fast on the upper disc 29 of the rack frame, so that said gear will be oscillated laterally to correspondingly oscillate the rack frame, together with the crane, or boom, 36 and saw 45, under movement of the piston, not shown, in opposite directions.

The hydraulic cylinder 58 and the piston rod 75 thereof (Figs. 1 and 4) are likewise counterparts of the cylinder 56 and piston rod 65 and the rack bar of said piston rod 75 serves to rotatably adjust the saw 45 in opposite directions about the axis of the head 39, or, of the crane, or boom, 36. To this end, said cylinder 58 is secured, as at 76, to one of the crane bars 37 with the teeth on the rack bar part of the rod 75 meshing with a gear pinion 77 fast on one end of a shaft 78 extending across said bar through a bearing 79 on the bar. The other end of the shaft has fast thereon a bevel gear 80 meshing with a bevel gear 81 fast on the rear end of the hollow shaft 40 and rotatable about the drive transmitting shaft 46. By this arrangement, the hollow shaft 40 is rotated by the gearing 78, 80, 81, and hence the entire head, to correspondingly rotatably adjust the saw 45. Suitable means may be provided for locking the head 39 and saw 45 in different positions, when rotatably adjusted, comprising a series of peripheral sockets 82 (Fig. 11) in the hollow shaft 40 for seating one end of a spring loaded bolt 83 (Fig. 12) slidably mounted in a cylinder 84 mounted by arms 85 thereon on the crane, or boom, 36, said arms being bolted, as at 86, to said crane, or boom, 36. For releasing the bolt 83, a forked bell crank 87 straddling the head end of said bolt is provided, and which is pivoted, as at 88, on the crane, or boom, 36 and provided with a pull rope 89 which may be extended back within reach of the operator of the tractor.

Referring now more particularly to Figures 15 to 17, a suitable valved pipe line and oil supply system, such as that shown, is provided for supplying each cylinder 55, 56, 57, 58 with fluid under pressure and at opposite ends thereof alternately to operate the piston and piston rod in opposite directions. In the illustrated system, a storage tank 90 for oil is provided and which may be located as desired on the tractor, for instance, in the transmission casing 10. A supply line 91 extends from the tank 90 to the intake side of a suitable pump 92 and from the discharge side of said pump by way of branches 93 to the inlet sides 94 of control valves 95, 96, 97, 98 for controlling the flow of oil to the cylinders 55, 56, 57 and 58, respectively. An oil return line 99 having branches 100 extending from the return sides 101 of said valves leads back to said tank 90. The valves 95, 96, 97, 98 being identical in construction and operation, a description of one will suffice for all. For instance, valve 95 is provided with a pair of diametrically opposite outlets 102. The outlets 102 are connected, in the case of valve 95, to opposite ends of the cylinder 55 by a pair of pipe lines 103 including flexible end sections 104. A grooved core 105 in said valve 95 operative by a hand lever 106 provides for connecting the intake side 94 of said valve with either outlet 102 and the other outlet with the return side 101 of the valve, or, for a neutral valve closing positioning of said core. A suitable pointer 107 and graduations 108 are provided on the valve 95 to indicate the different positions of the core 105. The numeral 109 designates the pipe lines leading from the discharges of the valve 96 to the cylinder 56 in the same manner as the lines 104 to cylinder 95, while numeral 110 designates similar pipe lines between the valve 97 and the cylinder 57, and numeral 111 similar lines between the valve 98 and the cylinder 58. A branch line 112 extends from the supply line 91 to the tank 90 with a pressure control valve 113 interposed therein, whereby when the valves 96 to 98 are set to neutral, valve closing positions, the oil may be bypassed from the supply line 91 back to the supply tank 90.

As will now be apparent, by swinging the main frame 11, the crane, or boom, 36 may be tilted vertically about the axis of the drive shaft 16 to elevate or lower the saw 45, and by vertically adjusting the crane, or boom, carriage 34 on the rack bars 31 of the rack frame, said crane, or boom, 36 may be elevated or lowered in a straight horizontal position, or otherwise, to elevate or lower the saw 45. Also, by oscillating the rack frame, and consequently the crane, or boom, carriage 34 and crane about the jack shaft 28, said crane, or boom, 36 may be swung from side to side so that the saw 45 will cut in swaths. Further, by rotatably adjusting the saw 45 on the crane, or boom, 36, in the manner described, it may be set to cut in different planes, either above, below, or to either side of said crane, or boom, 36.

The foregoing will, it is believed, suffice to impart a clear understanding of my invention without further explanation.

Manifestly, the invention, as described, is susceptible of modification without departing from the inventive concept, and right is herein reserved to such modifications as fall within the scope of the appended claims.

What I claim is:

1. The combination with a tractor having a power take-off, of a main frame vertically disposed in front of the tractor and mounted thereon for swinging movement forwardly and rearwardly, a crane extending forwardly from said frame, means pivotally mounting the rear end of said crane in said frame for swinging movement of the crane laterally, a circular rotary saw, means to mount said saw on the front end of the crane, and means to rotate said saw by said power take-off, the first-mentioned means comprising a rack frame mounted in said main frame for oscillation about a vertical axis and including vertical rack bars, and a crane carrying carriage vertically adjustable on said rack bars, and hydraulic means for swinging said main frame, oscillating said rack frame and adjusting said carriage vertically from the tractor.

2. The combination with a tractor having a power take-off, of a main frame vertically disposed in front of the tractor and mounted thereon, a crane extending forwardly from said frame, means pivotally mounting the rear end of said crane in said frame for swinging movement laterally and adjustment vertically comprising a rack frame mounted in said main frame for oscillation about a vertical axis and including vertical rack bars, and a frame-carrying carriage vertically adjustable on said rack bars.

3. The combination with a tractor having a power take-off, of a shaft housing extending across the front of the tractor and mounted thereon, a driven shaft extending through said housing, operating connections between said power take-off and said shaft, a main frame suspended from said housing for swinging forwardly and rearwardly, respectively, a rack frame mounted in said main frame for oscillation about a vertical axis, a carriage vertically adjustable on said rack frame, a crane extending forwardly from said carriage and having a rotary saw thereon, and operating connections between said driven shaft and saw.

4. The combination with a tractor having a power take-off, of a shaft housing extending across the front of the tractor and mounted thereon, a driven shaft extending through said housing, operating connections between said power take-off and said shaft, a main frame suspended from said housing for swinging forwardly and rearwardly, respectively, a rack frame mounted in said main frame for oscillation about a vertical axis, a carriage vertically adjustable on said rack frame, a crane extending forwardly from said carriage and having a rotary saw thereon, and operating connections between said driven shaft and saw including a jack shaft rotatably mounted in said main frame, said rack frame oscillating about said jack shaft.

LAURENCE D. HILLYER.